June 25, 1929.  H. F. FRANKLIN  1,718,457
FLUID PRESSURE ACTUATING MECHANISM
Filed Sept. 14, 1927
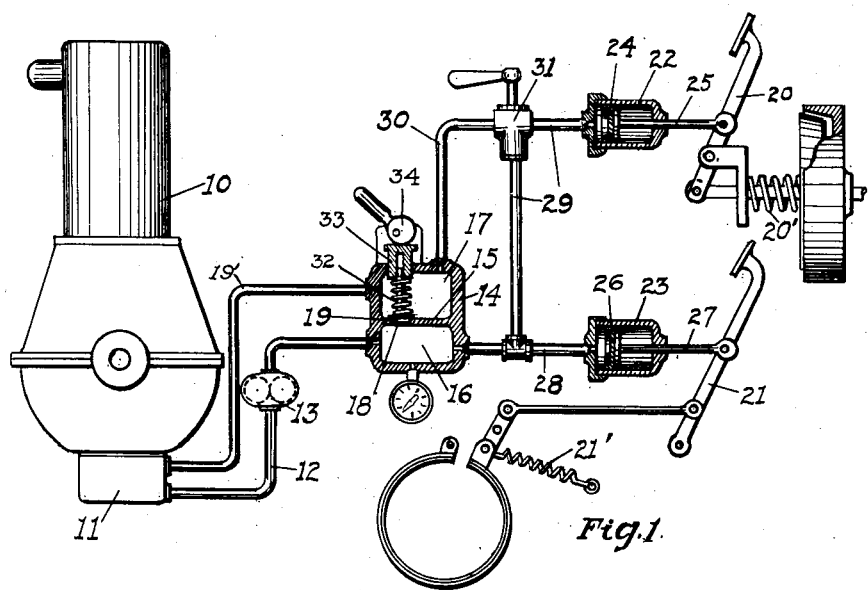
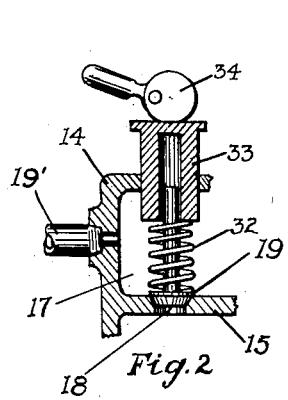
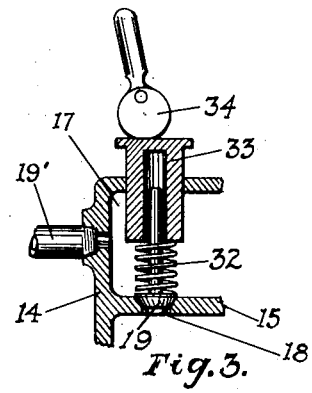
INVENTOR.
Hubert F. Franklin
BY
ATTORNEYS.

Patented June 25, 1929.

1,718,457

UNITED STATES PATENT OFFICE.

HUBERT F. FRANKLIN, OF HEMPSTEAD, NEW YORK.

FLUID-PRESSURE-ACTUATING MECHANISM.

Application filed September 14, 1927. Serial No. 219,416.

My invention relates to means or mechanism for actuating by fluid pressure one or more control devices heretofore manually controlled.

An object of the invention is to provide in an organization of machine parts a chamber or the like into which an inelastic fluid is introduced under pressure; such chamber or the like having associated with it a suitable valve or the like by means of which the pressure in said chamber may be built up or released as desired.

A further object of the invention is to provide in connection with said pressure chamber suitable means or mechanism whereby, as a result of the pressure variation in said chamber, one or more control devices may be actuated at will and in direct proportion to said pressure variation.

A still further object of the invention is to so organize and arrange the parts comprising the device of my invention as to admit of the necessary operation of one control device (where two are provided) without correspondingly or in any way affecting the operation of the other.

Other objects and advantages of the invention will be hereinafter set forth.

In the drawings, wherein like reference characters denote like or corresponding parts, Fig. 1 is a diagrammatic illustration of the invention showing, as an instance of utility, its use or associatoin with the power plant, clutch pedal and brake pedal of an automotive vehicle;

Fig. 2 is a detail sectional view of the control valve and its operating mechanism, the valve in the position of adjustment shown being movable under a predetermined minimum fluid pressure, and Fig. 3 is a similar view showing the valve in that position of adjustment in which a predetermined maximum pressure is required to unseat the valve.

In the embodiment of the invention selected for illustration, an internal combustion engine 10 having an oil sump 11 is shown. The invention, as intimated, can be used on or in connection with any organization of machine parts. By selecting an internal combustion engine, however, the oiling system thereof can be utilized as a source of inelastic fluid supply.

From the oil sump 11 the inelastic fluid is delivered by a pipe 12, and a gear or other type pump 13, to an oil or pressure chamber 14. This chamber 14 is preferably interiorally partitioned as at 15 to provide separate compartments 16 and 17; said partition having formed therein an opening 18 which is normally closed by a pressure relief valve 19. A return pipe 19' is in open communication with the compartment 17 to deliver the oil entering said compartment back again to the oil sump 11. The pump 13 may or may not be driven directly off the motor 10.

In addition to the chamber 14 I provide, where the invention is used as an actuating means for the clutch pedal 20 and the brake pedal 21 of an automotive vehicle, two cylinders 22 and 23. Each said cylinder has enclosed therein a piston. The piston 24 enclosed in the cylinder 22 is fastened to the clutch pedal 20 by means of a rod 25 and the piston 26 enclosed in the cylinder 23 is fastened to the brake pedal 21 by means of a rod 27. Thus connected, as said pistons 24 and 26 are moved back and forth within the cylinders 22 and 23, such motion is directly carried to the pedals 20 and 21. A clutch spring 20' and a brake spring 21' normally throw in the clutch and release the brake respectively when pressure on the pedals 20 and 21 is removed.

The cylinder 23 is at all times in open communication with the compartment 16 of the pressure chamber by means of a pipe 28. The cylinder 22, however, instead of being in open communication with said compartment 16, communicates with the pipe 28 by means of a pipe 29 which is provided, at its juncture with a return pipe 30, with a two-way valve 31. Said return pipe 30 terminates at its opposite end with the compartment 17 of the pressure chamber. By turning said valve 31, the fluid pressure in the cylinder 22 is either built up or released as desired.

The pressure relief valve 19, (see Figs. 2 and 3) is so related to its valve seat surrounding the opening 18 as to uncover said opening should the pressure in the compartment 16 exceed a predetermined value. To maintain such valve 19 normally in engagement with its seat, a valve spring 32 is provided. Said spring 32 bears at one end against the head of the valve 19 and at its opposite end bears against the inner end of an adjustable combination valve guide and cam follower 33. By means of a cam 34 said cam follower 33 may be properly and accurately adjusted to vary, at will, the resistance of the spring 32. It will be noted that the stem of the valve 19 enters into and is guided in its movement by the cam follower 33.

With the cam positioned as illustrated in Fig. 2, the valve 19 is adapted to be unseated immediately the pressure in the compartment 16 reaches a predetermined minimum value. This predetermined minimum value, which is governed by the resistance of the spring 32, should under no circumstances exceed the pressure required to overcome the resistance of the brake spring 21' but should, on the other hand, be of sufficient value to instantly overcome the resistance of the clutch spring 20'. By thus maintaining a predetermined minimum pressure value of the proportion indicated, the clutch may be instantly disengaged without applying the brake or brakes by simply opening communication between the pipe 28 and the cylinder 22 thru the operation of the two-way valve 31. A reverse movement of the two-way valve will close communication between the pipe 28 and the cylinder 22 and at the same time establish communication between said cylinder and the chamber 17, thereby releasing the pressure on the clutch pedal 20.

To gradually apply the brake or brakes it is but necessary to increase the resistance of the spring 32 by adjusting the cam follower 33 thru the operation of the cam 34. As said cam 34 is moved from the position indicated in Fig. 2 toward the position indicated in Fig. 3, the cam follower is forced inwardly or toward the valve seat. Such movement of the cam follower compresses the spring 32 to thereby proportionately increase the pressure value required to be exerted on the valve 19 to move it away from its seat. This increased pressure, as it builds up within the compartment 16, acts on the piston 26 and thru the movement of said piston is transmitted to the brake pedal 21 with sufficient force to overcome the brake spring 21' and apply the brake or brakes.

A fluid pressure operating means or mechanism of the character above set forth is especially useful in operating as aforesaid the clutch and brake mechanism of an automotive vehicle. It is possible thru the operation of the cam 34 to apply the vehicle brakes without disengaging the clutch, and it is possible thru the operation of the two-way valve 31 to disengage the clutch without operating the brakes, or, when it is desired that both should be operated simultaneously, it is but necessary that the two-way valve and the cam 34 be operated at one and the same time. Preferably said valve 31 and said cam 34 are conveniently located in close proximity to the driver's seat. Moreover, an unintentional operation of either clutch or brake is impossible under fluid pressure since such pressure the moment the predetermined minimum value is reached, is automatically relieved thru the unseating of the valve 19.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, with any source of inelastic fluid supply, of a chamber having a supply connection and a return connection with said source of fluid supply, and to which said inelastic fluid is delivered under pressure, separate control devices, a cylinder and a piston for each said control device, each said cylinder being in communication with said chamber and each said piston being movable in its associated cylinder to respectively control the operation of said control devices, means freely operable to build up and release at will the fluid pressure in said chamber, and means for opening and closing communication between one said cylinder and said chamber without affecting in any way the line of communication between said chamber and the other said cylinder.

2. The combination, with any source of inelastic fluid supply, of a chamber having a supply connection and a return connection with said source of fluid supply, and to which said inelastic fluid is delivered under pressure, separate control devices, a cylinder and a piston for each said control device, each said cylinder being in communication with said chamber and each said piston being movable in its associated cylinder to respectively control the operation of said control devices, a valve freely operable to open and close communication between one said cylinder and said chamber, and means operable to build up and release at will the fluid pressure in said chamber.

3. The combination, with any source of inelastic fluid supply, of a chamber having a supply connection and a return connection with said source of fluid supply, and to which said inelastic fluid is delivered under pressure, separate control devices, a cylinder and a piston for each said control device, each said cylinder being in communication with said chamber and each said piston being movable in its associated cylinder to respectively control the operation of said control devices, means for cutting in or out, at will, the line of communication between said chamber and one said cylinder, a relief valve movable under the influence of the fluid pressure in said chamber, and means associated with said valve and freely operable to regulate at will the degree of pressure required to unseat said valve.

4. In an automotive vehicle, the combination with the lubrication system of the power plant thereof, of a chamber having a supply connection and a return connection with said system, and to which oil is delivered under pressure, a brake control device, a clutch control device, a cylinder and a piston for each said control device, each said cylinder being in communication with said chamber and each said piston being movable in its associated cylinder to respectively operate said brake control device and said clutch control device, a valve freely operable to open and close at will communication between said chamber and the cylinder within which the piston for controlling the operation of the clutch pedal is enclosed, a relief valve operable under the influence of the oil pressure in said chamber, and a freely operable means for regulating at will the degree of pressure required to move said valve.

In testimony whereof I hereunto affix my signature.

HUBERT F. FRANKLIN.